(12) United States Patent
Rai et al.

(10) Patent No.: US 7,676,561 B1
(45) Date of Patent: Mar. 9, 2010

(54) METHOD AND APPARATUS FOR ADAPTIVE LOAD BALANCING

(75) Inventors: Shirish Rai, Austin, TX (US); Christine Tomlinson, Austin, TX (US)

(73) Assignee: Sun Microsystems, Inc., Santa Clara, CA (US)

( * ) Notice: Subject to any disclaimer, the term of this patent is extended or adjusted under 35 U.S.C. 154(b) by 1455 days.

(21) Appl. No.: 10/725,738

(22) Filed: Dec. 2, 2003

(51) Int. Cl.
*G06F 15/173* (2006.01)

(52) U.S. Cl. ........................ 709/223; 709/224

(58) Field of Classification Search ................. 709/223, 709/224, 226
See application file for complete search history.

(56) References Cited

U.S. PATENT DOCUMENTS

| | | | | |
|---|---|---|---|---|
| 7,308,475 | B1 * | 12/2007 | Pruitt et al. ................. | 709/203 |
| 2001/0039581 | A1 * | 11/2001 | Deng et al. ................. | 709/226 |
| 2002/0032777 | A1 * | 3/2002 | Kawata et al. .............. | 709/226 |
| 2002/0120743 | A1 * | 8/2002 | Shabtay et al. ............. | 709/226 |
| 2002/0129134 | A1 * | 9/2002 | Leighton et al. ............ | 709/223 |
| 2003/0037093 | A1 * | 2/2003 | Bhat et al. .................. | 709/105 |
| 2004/0024861 | A1 * | 2/2004 | Coughlin .................... | 709/224 |
| 2005/0091217 | A1 * | 4/2005 | Schlangen .................. | 707/10 |

OTHER PUBLICATIONS

Cherkasova, Ludmila, "FLEX: Load Balancing and Management Strategy for Scalable Web Hosting Service", In Proceedings of the IEEE Symposium on Computers and Communications, Jul. 2000, 6 pages.
Bestavros, Azer et al., "Probabilistic Job Scheduling for Distributed Real-time Applications", In Proceedings of the 1st IEEE Workshop on Real-Time Applications, May 1993, 6 pages.
Cherkasova, Ludmila et al., "Scalable Web Server Cluster Design with Workload-Aware Request Distribution Strategy WARD", In Proceedings of the IEEE International Workshop on Advanced Issues in E-Commerce and Web-Based Information Systems, Jun. 2001, 10 pages.

* cited by examiner

*Primary Examiner*—Larry Donaghue
*Assistant Examiner*—Brian J Gillis
(74) *Attorney, Agent, or Firm*—Brooks Kushman P.C.

(57) ABSTRACT

Determining server capabilities during a discrete time period, or interval, allows for more efficient processing of client requests. Updating a proportional server capability load balancing information encoding at intervals allows a load balancer to handle client requests without the overhead of determining current server capabilities. Decision-making can be reduced to quick selection of one of a group of servers without considering the server's capability, since the server's capability has previously been considered when collecting the load balancing information.

62 Claims, 6 Drawing Sheets

METHOD AND APPARATUS FOR ADAPTIVE LOAD BALANCING

BACKGROUND

1. Field of the Invention

The present invention relates to the field of networks. More specifically, the present invention relates to load balancing.

2. Description of the Related Art

Networked systems often utilize multiple servers (e.g., server farms) to service client requests (e.g., directory requests). A load balance mechanism can be employed in the network systems to balance work load across the multiple servers.

Typically, a load balancer attempts to distribute work over servers to optimize utilization of network resources. In some cases, the load balancer will send a greater amount of work (e.g., more complex requests, a greater number of requests) to servers with greater capabilities, and will send a lower amount of work to servers with lesser capabilities. In some circumstances, servers will have the same capabilities, thus the load balancer sends equal amounts of work to each server.

Despite the potential benefits of load balancing, their increased complexity of decision making can introduce delay into processing requests. Depending on the employed balancing criteria, significant resources, including processing time, may be expended in determining an appropriate destination server for a request. While a substantial level of additional latency may be tolerable in some load balancing applications, other applications, particularly those that include a substantial population of short lived operations, may not tolerate such latencies. Low overhead and/or low-latency decision functions are needed.

SUMMARY

Updating load balancing information, which reflects proportional server capability, facilitates efficient adaptive load balancing. Maintained load balancing information can be utilized to perform low overhead/low-latency load balancing. Updating proportional server capability load balancing information allows adjustments for various factors, such as failure of a server, addition of a server, upgrading of a server, etc. The load balancing information allows substantially reduced load balancing decision-making. For example, decision-making can be reduced to quick selection of one of a group of servers without considering the server's capability, since the server's capability has previously been considered when collecting the load balancing information. Locks on shared data can be avoided since changes to the load balancing information can be performed atomically. In addition, infrequent updating of a load balancing structure makes lock contention on the load balancing structure negligible.

According to some embodiments of the invention, a load balancer collects server capability information for a plurality of servers. The server capability information is based at least in part on processing of sample requests transmitted to the plurality of servers during intervals. The load balancer load balances client requests in accordance with the collected server capability information.

According to some embodiments of the invention, a method provides for collecting, during intervals, data that reflects capabilities of a plurality of backend servers, wherein the backend server capability data is based at least in part on servicing of sample requests by the plurality of backend servers. The method also provides for encoding the collected backend server capability data to reflect proportional backend server capability of each of the plurality of backend servers.

According to some embodiments of the invention, client requests are load balanced across a plurality of servers in accordance with a proportional server capability information encoding that reflects proportional capabilities of the plurality of servers. The reflected proportional server capability information is based at least in part on servicing of sample requests by the plurality of servers.

According to some embodiments of the invention, during a data collection interval, sample requests are transmitted to servers and data that corresponds to servicing of the transmitted sample requests by each of the servers is recorded. The recorded data is encoded. The encoded data indicates each of the servers in accordance with their proportional server capability based at least in part on the recorded data.

According to some embodiments of the invention, an apparatus comprises a network interface and means for load balancing client requests in accordance with a proportional server capability load balancing information encoding that is updated in accordance with server capability information. The server capability information is based at least in part on processing of sample requests by a plurality of servers during intervals.

According to some embodiments of the invention, a computer program product encoded in one or more machine-readable media comprises a first sequence of instructions to transmit sample requests to a plurality of servers at intervals and receive responses corresponding thereto. The computer program product also comprises a second sequence of instructions to determine proportional capability information for each of the plurality of servers based at least in part on the sample requests and corresponding responses.

According to some embodiments of the invention, a computer program product encoded in one or more machine-readable media, comprises a first sequence of instructions to update a proportional server capability load balancing information encoding that reflects proportional measured sample request based capabilities of a plurality of servers. The capabilities are measured during intervals. A second sequence of instruction select server indications from the proportional server capability load balancing information encoding to load balance client requests.

According to some embodiments of the invention, a network comprises a plurality of servers processing requests, and a load balancer forwarding client requests in accordance with a proportional server capability information encoding that indicates each of the plurality of servers in accordance with their proportional capability. The proportional server capability information encoding is based at least in part on servicing of sample requests during intervals between forwarding of client requests.

These and other aspects of the described invention will be better described with reference to the Description of the Preferred Embodiment(s) and accompanying Figures.

BRIEF DESCRIPTION OF THE DRAWINGS

The present invention may be better understood, and its numerous objects, features, and advantages made apparent to those skilled in the art by referencing the accompanying drawings.

FIG. 1A depicts a load balancer collecting data according to some realizations of the invention. FIG. 1B depicts the load balancer balancing client requests across backend servers according to some realizations of the invention.

The use of the same reference symbols in different drawings indicates similar or identical items.

DESCRIPTION OF THE PREFERRED EMBODIMENT(S)

The description that follows includes exemplary systems, methods, techniques, instruction sequences and computer program products that embody techniques of the present invention. In particular, in some instances particular implementations suited to transactions, protocols, and services typical of servers such as those in accordance with Lightweight Data Access Protocol (LDAP), Universal Description, Discovery and Integration (UDDI), or the like, are described in some detail. However, it is understood that the described invention may be practiced without these specific details. In other instances, well-known protocols, structures and techniques have not been shown in detail in order not to obscure more general aspects of the invention.

Implementation of a load balancer ranges from a dedicated hardware load balancer to a process running on one or more network elements. The following description refers to a load balancer. The described load balancer may be implemented as an intermediary machine, software on an intermediary machine, firmware in an intermediary machine, processes on multiple intermediary machines, etc.

Figure 1A:
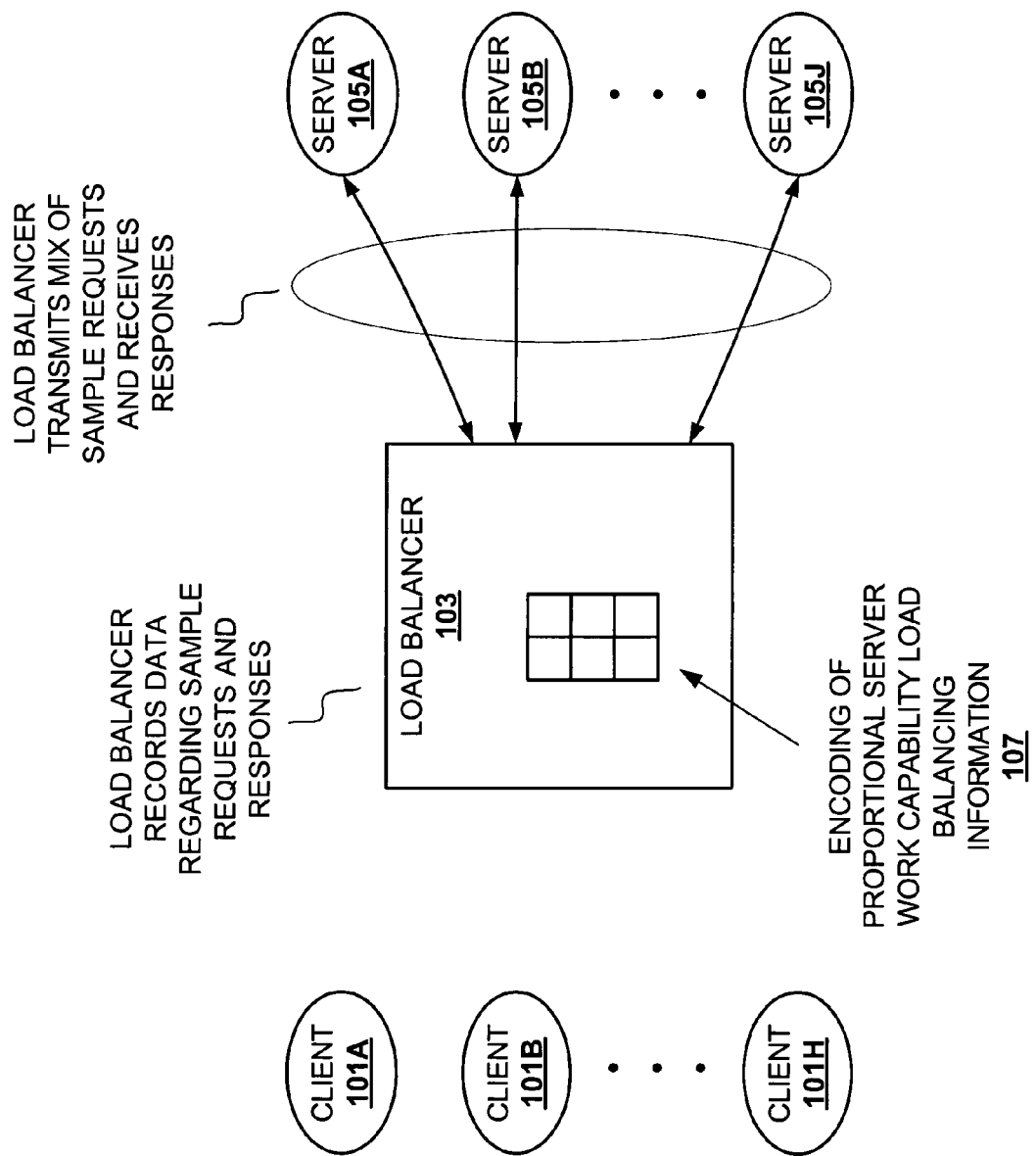
FIGS. 1A-1B depict a network that includes an exemplary load balancer according to some realizations of the invention.
Figure 1B:
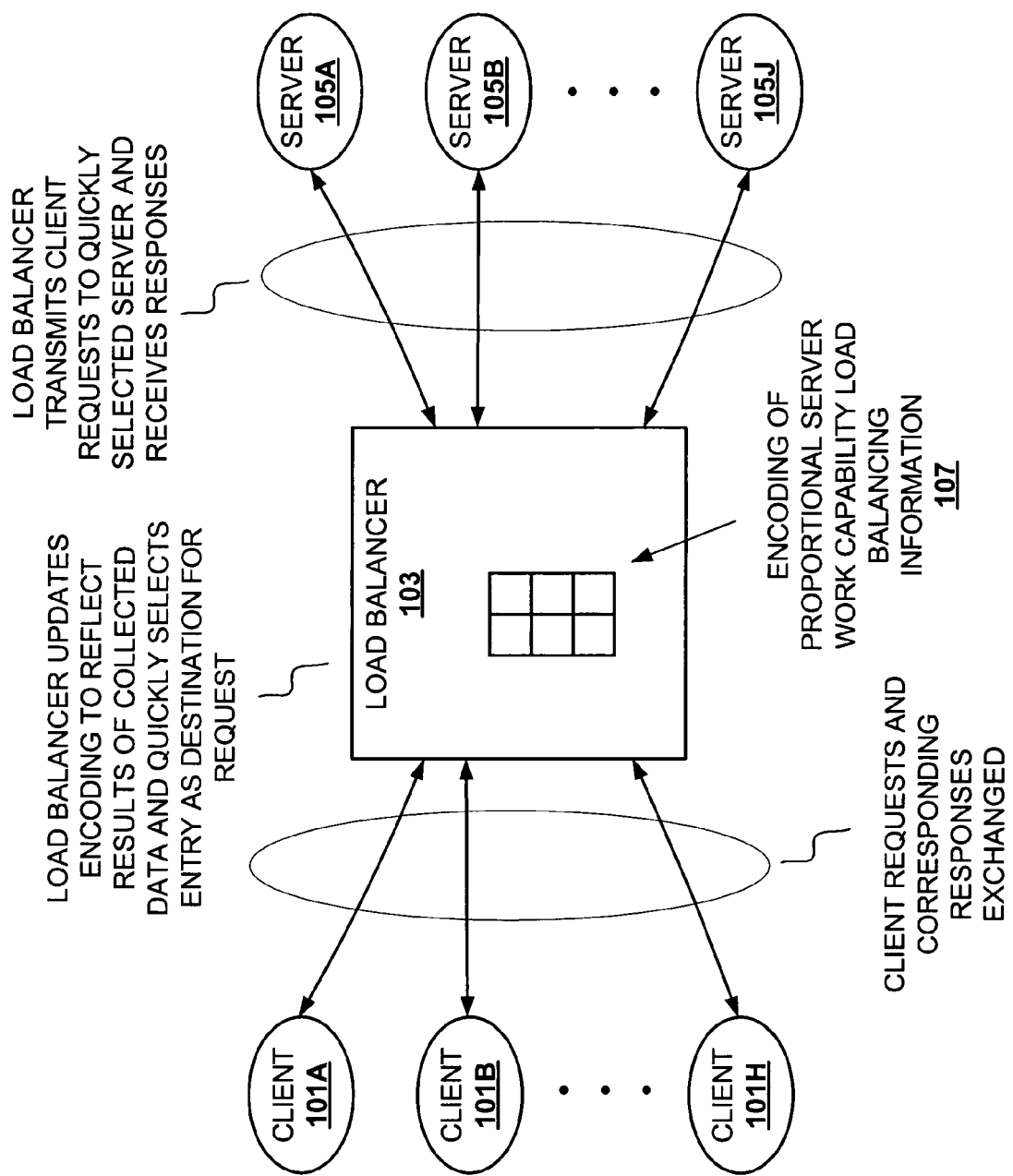

FIGS. 1A-1B depict a network that includes an exemplary load balancer according to some realizations of the invention. FIG. 1A depicts a load balancer collecting data according to some realizations of the invention. In FIG. 1A, a network includes clients 101A-101H, a load balancer 103, and servers 105A-105J. The servers 105A-105J host directories. The load balancer 103 load balances directory requests across the backend servers 105A-105J. The load balancer 103 includes an encoding of proportional server capability load balancing information 107. Various realizations of the invention encode the proportional server capability load balancing information differently. For example, the proportional server capability load balancing information may be encoded in one or more of a variety of different data structures (e.g., a hash table, binary search tree, trie, linked list, etc.). The encoded proportional server capability load balancing information includes information that indicates each server's capability relative to the other servers.

The load balancer 103 begins collecting data from the backend servers 105A-105J. Various realizations of the invention collect data during different intervals (e.g., periodic intervals, scheduled varying intervals, combination of scheduled and unscheduled intervals, event triggered intervals, etc.). The load balancer 103 transmits sample directory requests (e.g., search requests, update requests, compare requests, etc.) to the backend servers 105A-105J. Various realizations of the invention transmit different directory requests. For example, the load balancer may transmit to the backend servers search requests with the same attributes, search requests with different attributes, a mixture of directory request types, a configurable mix of directory requests, etc.). In addition, the sample directory requests are configured differently in different realizations of the invention (e.g., the sample directory requests are configured to be simple operations; the sample directory requests are configured to be complex operations; etc.). The backend servers 105A-105J transmit responses to the requests back to the load balancer 103. The load balancer 103 records data regarding the sample directory requests and responses exchanged with the backend servers 105A-105J, such as frequency of responses provided by each backend server.

FIG. 1B depicts the load balancer balancing client requests across backend servers according to some realizations of the invention. In FIG. 1B, the load balancer 103 updates the encoding of proportional server capability load balancing information 107 to reflect the results of the data collected from the backend servers.

The load balancer 103 load balances client directory requests with the encoding of proportional server capability load balancing information 107. The clients 101A-101H transmit client directory requests to the load balancer 103. In general, the load balancer 103 quickly selects entries from the encoding of proportional server capability load balancing information 107 to determine destinations for the client directory requests. The entry may be selected quickly according to a number of techniques. For example, the entry may be selected at random, such as with a random number generator, a function that randomly (or pseudo-randomly) selects entries from an array, etc. Another exemplary technique may select servers based at least in part on the encoding of proportional server capability load balancing information sequentially. For example, a data structure is populated with server indications in accordance with the proportional server capability. The population of the data structure may be in an ordered manner or random/pseudo-random manner. The load balancer walks down the structure and selects whatever server that is indicated by the current entry, similar to a round robin selection technique. Another exemplary technique may switch between sequential selection from the front of a list of servers and the tail of a list of servers.

The load balancer 103 transmits the client directory requests to the selected ones of the backend servers 105A-105J. The selected ones of the backend servers 105A-105J service the client directory requests and provide responses to the load balancer 103. The load balancer 103 relays these responses to the appropriate ones of the clients 101A-101H.

The network illustrated in FIGS. 1A-1B may include network elements intermediate to the clients 101A-101H and the load balancer 103 or intermediate to the load balancer 103 and the servers 105A-105J. Furthermore, additional load balancers or other network elements may operate in parallel or sequentially with the load balancer 103.

Various realizations of the invention modularize the adaptive load balancing operations differently. For example, a separate machine and/or process transmits sample requests and the load balancer records the collected data. In another example, a first process or machine performs operations for collecting data and updates the encoded proportional server capability load balancing information, which is used by a second process or machine that handles client requests.

Concentrating server capability determinations into discrete intervals facilitates a load balancer that processes client requests more efficiently than conventional load balancing techniques. Sample requests allow for determination of server capabilities without hindering client requests. Maintenance of the proportional server capability load balancing information during intervals instead of during processing of client requests increases the amount of resources available for processing client requests, which potentially increases throughput capability of a load balancer. Maintaining a proportional server capability load balancing information encoding that reflects proportional work capabilities of backend servers facilitates techniques for quick selection of a destination server for a client request, such as randomly selecting servers based at least in part on the encoded proportional server capability load balancing information.

Load balancing efficiency becomes more apparent when handling short-lived operations. Requests are serviced in 1-100 ms with most (80%) taking 2 to 3 ms or less. In such a scenario, the decision function (function that decides which server will service a request) should be extremely fast. The data on which the decision function will act, should be collected without imposing too much over-head on the whole system. Further, the load balancing mechanism should be sensitive to change in load characteristics of a server due to interferences outside the control of the load balancing mechanism. To provide efficient load balancing, particularly for short-lived operations, system calls, floating point arithmetic and lock contention should be minimized.

Efficient load balancing can be modularized into two parts: 1) data collection; and 2) creation and maintenance of an encoding of the collected data.

Figure 2:
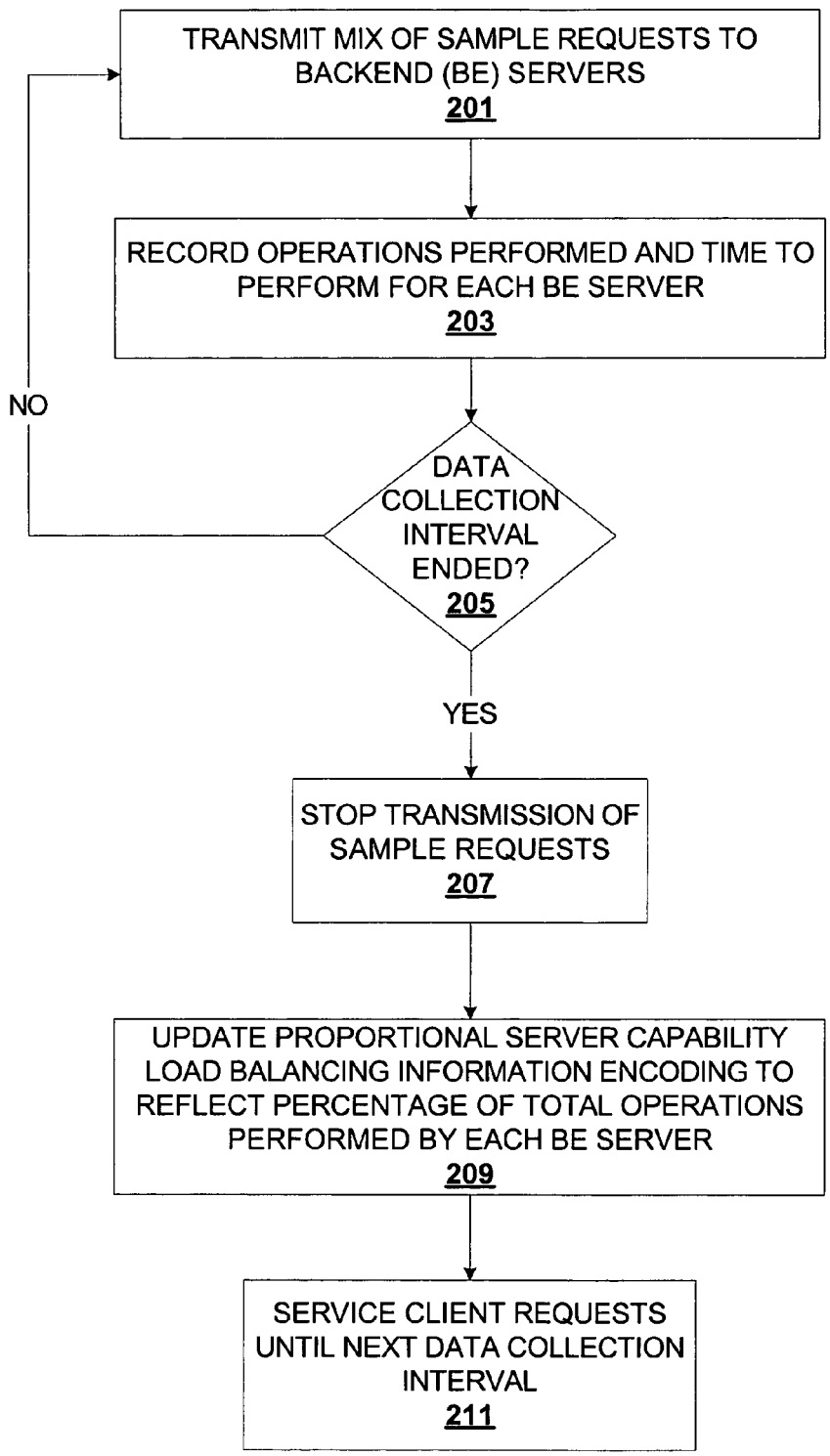
FIG. 2 depicts a flowchart for collecting data according to some realizations of the invention.

FIG. 2 depicts a flowchart for collecting data according to some realizations of the invention. At block 201, a mix of sample directory requests are transmitted to backend (BE) servers. At block 203, operations performed by the BE servers and the time to perform the operations are recorded for each BE server. At block 205, it is determined if the data collection interval has ended. If the data collection interval has ended, then control flows to block 207. If the data collection interval has not ended, then control flows back to block 201.

At block 207, transmission of sample directory requests is stopped. At block 209, the proportional server capability load balancing information encoding is updated to reflect percentage of total operations performed by each of the BE servers. Although block 209 refers to percentage, a variety of values can be used that convey the proportion of work performed by the servers with respect to the sample directory requests and/ or work capability of each server. At block 211, client directory requests are serviced until the next data collection interval.

The following exemplary code fragment updates a load balancing table and a decision function. The exemplary code fragment establishes and maintains the load balancing table in order to distribute the next n requests such that the over all response time is minimized, given the average amount of time taken by each server. If servers X, Y, and Z respectively take, on average, a, b, c times to process an operation, then xa+yb+ zc, where x, y, and z are the number of operations sent to X, Y, and Z respectively, should be minimized. The code fragment figures out how many operations a server can do based on its average times in the given interval. The load is distributed based on these numbers. If sample requests are not available for a given interval for a given server, samples from the previous data collection interval are used. Although the exemplary code fragment does not keep history since state changes quickly, realizations of the invention may maintain historical statistics and incorporate those historical statistics in future calculations.

iDAREErrorCode

LoadBalance::AdaptiveUsingSampling::calculate_op_rates (BE& be)

```
{
    int i, j;
    BeStats::Stats stats; //can be at most that many
    int num_be_data=0;
    int be_ops_done;
    long tot_ops_per_intvl=0;
    struct {
    Backend*be;
    long ops_per_intvl;
    int_percent;
    }be_data[32];
    HRTime_t be_tot_time;
    for (i=0, j=0; i<be._num_be; i++) {
    if (be._be[i]→server_up( )) {
        be._be[i]→get_and_decay_stats(stats);
        be_data[j].be=be._be[i];
        if (stats._tot_time==0) {
        be_data[j].ops_per_intvl=be._last_ops_per_intvl[i];
        } else {
        be_tot_time=stats._tot_time;
        be_ops_done=stats._ops_done;
        be_data[j].ops_per_intvl=(Util::get_ticks_per_sec(
            )*_interval)/
            (be_tot_time/be_ops_done);
        }
        be._last_ops_per_intvl[i]=be_data[j].ops_per_intvl;
        tot_ops_per_intvl+=be_data[j].ops_per_intvl;
        num_be_data++;
        j++;
    }
    }
    if (! num_be_data)
    return iDAR_Failure;
    //Find %
    double tot=(double)tot_ops_per_intvl;
    if (tot==0) tot=1; //just for sanaty. We dont want
devide by 0 errors
    int p_tot=0;
    for (i=0; i<num_be_data-1; i++) {
    be_data[i]._percent=
(int)((((double)be_data[i].ops_per_intvl)/tot)*100);
    p_tot+=be_data[i]._percent;
    }
    be_data[num_be_data-1]._percent=100-p_tot;    //round
the last one
    int pos=0;
    for (i=0; i<num_be_data; i++) {
    for (j=0; j<be_data[i]._percent; j++) {
        be._lb_tab[pos+j]=be_data[i].be;
    }
    pos=pos+j;
    }
    _next_interval=Time::cur_time( )+_interval;
    if (App::log→event_enabled(LL_TRACE)) {
    for (i=0; i<num_be_data; i++) {
        App::log→log(log_dsap, LL_TRACE, 450201, NULL,
            NULL,
            "Be (% s, % X) set to percent rate % d",
            be_data[i].be→name( ),
            be_data[i].be,
            be_data[i]._percent);
    }
    }
    return iDAR_Success;
}
```

Data collection for determining server capabilities for a group of servers can be done by sending a single set of sample requests to each server in the set of servers to be load balanced. A configurable mix of sample requests can be sent and response timed. The time can be measured with a high resolution timer, a system call to a time function, etc. Usually, a high resolution timer is more efficient than a time system call since only time intervals are returned. At the end of the data collection interval, the total time used to service requests and number of requests serviced can be used to create/maintain the load balancing information encoding. Client requests are typically not piggy-backed on sample requests because load characteristics may not be correctly revealed by a random mix of client requests.

The exemplary load balancing table utilized in the above code fragment is a simple array of 100 32 bit pointers, pointing to application specific structures that can contain information about a server. The above code fragment utilizes 32 bit points since conventional hardware performs 32 bit read and writes atomically. Therefore, as long as this array is correctly initialized before the decision function is first run, locks are avoided. The decision function can just pick a random number between 0-99 and return the contents of that position in the table as the next best server to send the request.

Figure 3:
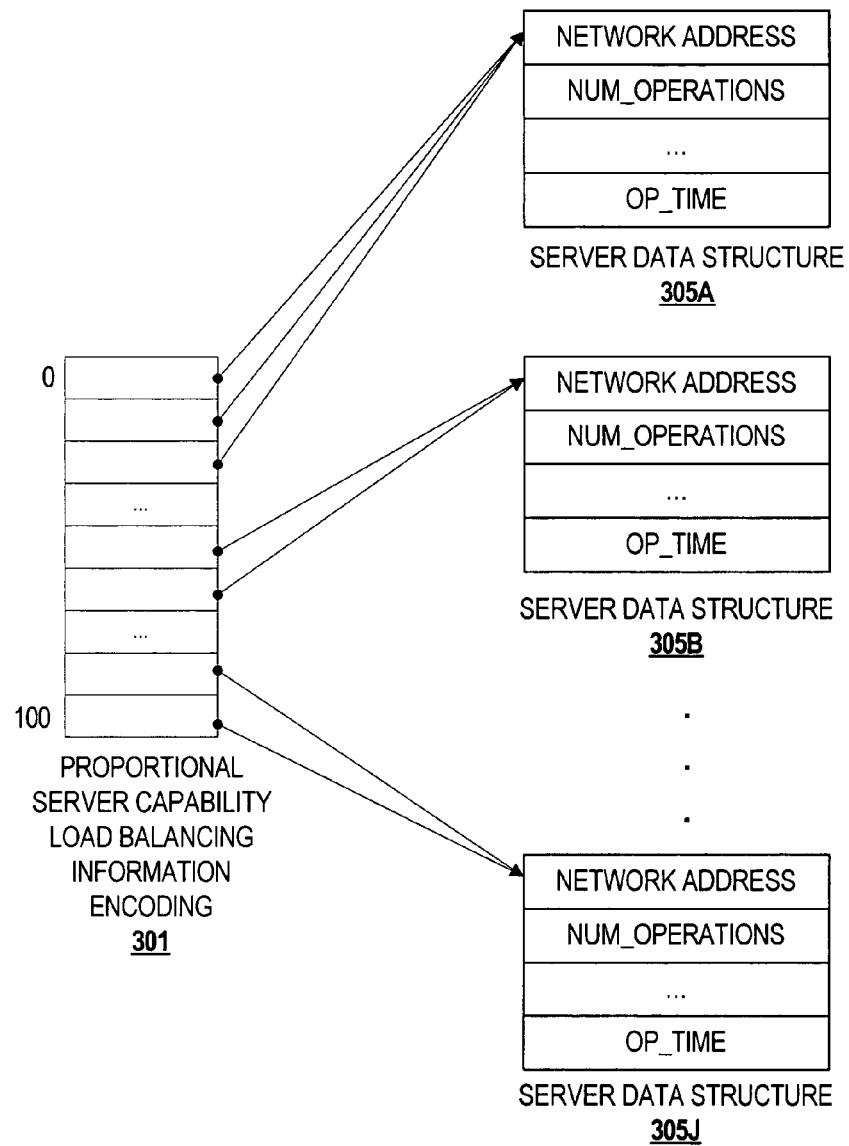
FIG. 3 depicts an exemplary proportional server capability load balancing information encoding according to some realizations of the invention.

FIG. 3 depicts an exemplary proportional server capability load balancing information encoding according to some realizations of the invention. In FIG. 3, a proportional server capability load balancing information encoding 301 includes 100 entries. The entries of the proportional server capability load balancing information encoding 301 reference server data structures 305A-305J. Each of the server data structures 305A-305J is referenced by a number of entries in the proportional server capability load balancing information encoding 301 indicative of the represented server's sample request servicing frequency. For example, assume the server represented by the server data structure 305A performed 40% of the work (e.g., responded to 40% of the total sample requests) during the data collection interval. The proportional server capability load balancing information encoding 301 indicates the 40% accordingly. Since the proportional server capability load balancing information encoding illustrated in FIG. 3 includes 100 entries, 40 of those entries are updated to reference the server data structure 305A. Therefore, when the load balancer selects an entry from the proportional server capability load balancing information encoding 301, there is a 40% likelihood that an entry that references the server data structure 305A will be selected.

Various realizations of the invention implement the proportional server capability load balancing information encoding differently. A variety of techniques can be utilized to reflect the proportion of work performed during the data collection interval. A proportional server capability load balancing information encoding may include a fewer or greater number of entries than illustrated in FIG. 3. Also, the proportional server capability load balancing information encoding may be implemented with various data structures (e.g., a hash table, binary search tree, trie, linked list, etc.). Furthermore, the proportional server capability load balancing information encoding may be implemented in a variety of hardware (e.g., multi-port cache, random access memory, fast-lookup tables, etc.).

Various realizations of the invention utilize the proportional server capability load balancing information encoding differently. For example, entries of the proportional server capability load balancing information encoding illustrated in FIG. 3 that reference the same server data structure are distributed throughout the proportional server capability load balancing information encoding instead of sequentially. The first entry of the proportional server capability load balancing information encoding is selected for the first request entries are selected in an ordered manner (e.g., sequentially from the head, sequentially from the tail, every $n^{th}$ entry until all entries have been selected once, etc.). In another example, after the proportional server capability load balancing information encoding is updated, a certain number of entries are randomly selected from the proportional server capability load balancing information encoding. Each randomly selected entry is represented in a linked list. As each client request is received, the load balancer walks down the linked list. In another example, the proportional server capability load balancing information encoding includes a number of entries equal to the number of servers. Input into a random number generator function is manipulated to account for each servers sample request servicing frequency or proportion of work performed during the data collection interval. For example, if there are 20 servers, then the proportional server capability load balancing information encoding will include 20 entries, each of which is associated with a server structure. When a random server is to be selected, the random number generator selects a random number from 1-20, but parameters that weigh the numbers so that each server's sample request servicing frequency are reflected are input into the random number generator function.

Selecting an entry from the proportional server capability load balancing information encoding allows efficient use of resources and relatively quick determination of a destination server for a client request. Instead of performing complex calculations, the load balancer quickly selects a destination server at random for a request. Although a server is selected at random, the proportional server capability load balancing information encoding is created and updated to increase the possibility of selection of servers in accordance with their capabilities.

The above examples are provided to aid in understanding the invention and are not meant to be limiting upon the invention. These examples illustrate just a few of the possible realizations of the invention and are not exclusive or limited to the examples described and not intended to be an exhaustive list of realizations of the invention.

Figure 4:
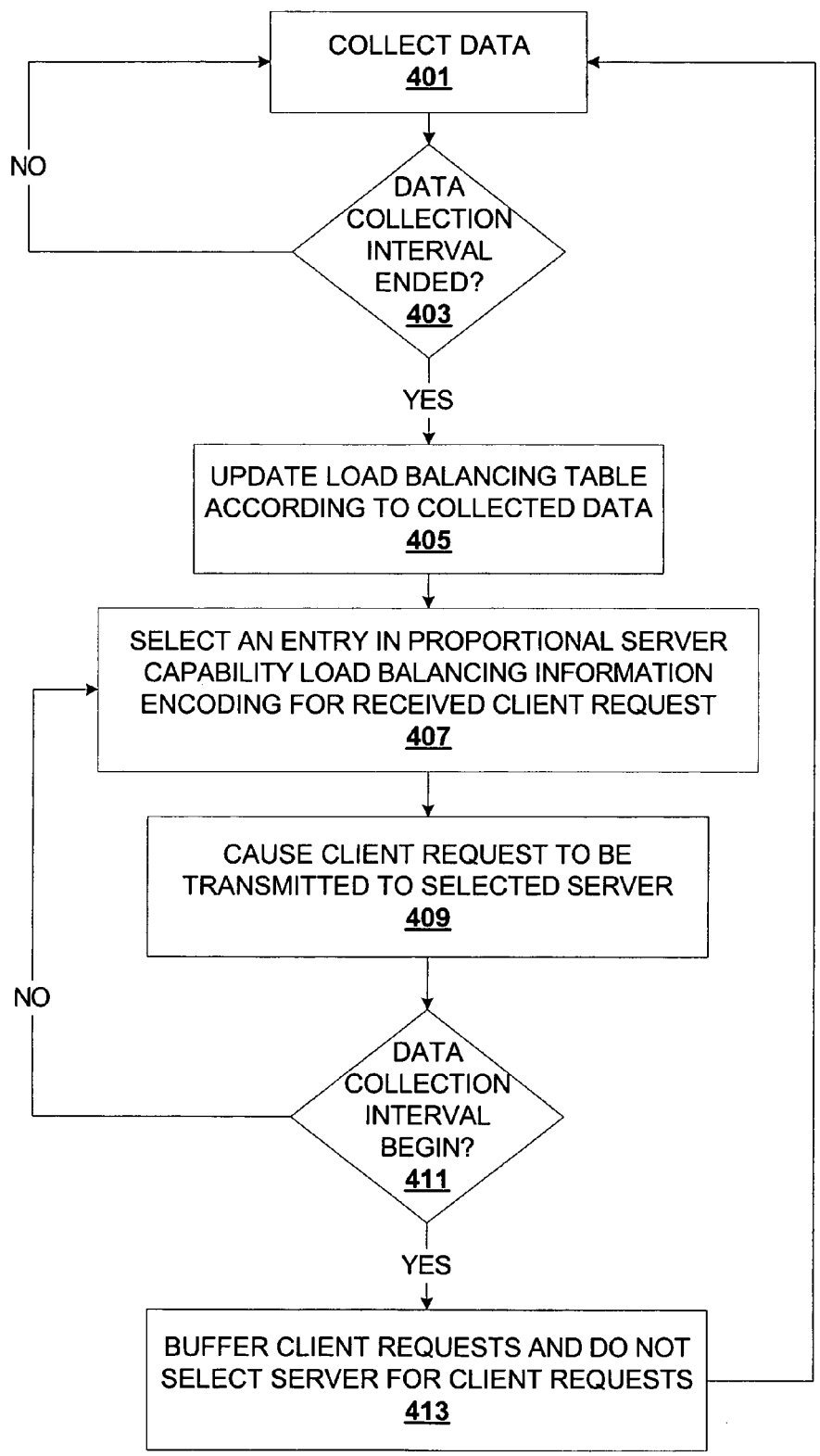
FIG. 4 depicts a flowchart for load balancing client requests according to some realizations of the invention.

FIG. 4 depicts a flowchart for load balancing client requests according to some realizations of the invention. At block 401, data is collected. At block 403, it is determined if the data collection interval ends. If the data collection interval has ended, then control flows to block 405. If the data collection interval has not ended, then control flows back to block 401.

At block 405, the proportional server capability load balancing information encoding is updated according to the data collection. In addition to changing sample request servicing frequency, servers may be removed (e.g., taken down for maintenance, removed from the network, go down because of failure, etc.) or added (e.g., a new server added to the network, a previously removed server returned to the network, etc.). At block 407, an entry is randomly selected from the proportional server capability load balancing information encoding for a received client request. At block 409, the client request is caused to be transmitted to the server that corresponds to the randomly selected proportional server capability load balancing information encoding entry. At block 411, it is determined if the data collection interval begins. If the data collection interval begins, then control flows to block 413. If the data collection does not begin, then control flows back to block 407.

At block 413, client requests are buffered and a server is not selected for the client requests until the data collection interval ends. From block 413 control flows back to block 401. Various realizations of the invention implement the data collection interval with client request processing differently (e.g., a certain number of servers handle both client requests and sample requests both of which are included in the calculations of work proportion, a certain number of servers are not part of data collection and handle client requests during the data collection interval, etc.).

While the flow diagrams show a particular order of operations performed by certain realizations of the invention, it should be understood that such order is exemplary (e.g., alternative realizations may perform the operations in a different order, combine certain operations, overlap certain operations, perform certain operations in parallel, etc.).

The following exemplary code fragment returns the next server for a client request. As previously stated, locks are avoided unless the load balancing table is updated. Since a load balancing table is updated relatively infrequently (e.g., once in 10 seconds), lock contention is practically negligible.

```
Backend*LoadBalance::AdaptiveUsingSampling::get_be( )
{
  Backend*ret=NULL;
  if (Time::cur_time( )>=_next_interval) {
  //control entry to data modifying functions. Data itself does
      not need
  //protection
  _mutex.acquire( );
  if (calculate_op_rates
        (_cur_BE==LoadBalance::P_BE ? _be[LoadBalance::
          P_BE]
          :be[LoadBalance::F_BE])
      !=iDAR_Success) {
          remake_interval(NULL,   false,   LoadBalance::
            NO_BE);
      }
      _mutex.release( );
  }
  //get random number and return be
  long r=Util::rand__100( );
  ret=_be[_cur_BE]._lb_tab[r];
  return ret;

}
```

The described invention may be provided as a computer program product, or software, that may include a machine-readable medium having stored thereon instructions, which may be used to program a computer system (or other electronic devices) to perform a process according to the present invention. A machine readable medium includes any mechanism for storing or transmitting information in a form (e.g., software, processing application) readable by a machine (e.g., a computer). The machine-readable medium may include, but is not limited to, magnetic storage medium (e.g., floppy diskette); optical storage medium (e.g., CD-ROM); magneto-optical storage medium; read only memory (ROM); random access memory (RAM); erasable programmable memory (e.g., EPROM and EEPROM); flash memory; electrical, optical, acoustical or other form of propagated signal (e.g., carrier waves, infrared signals, digital signals, etc.); or other type of medium suitable for storing electronic instructions.

Figure 5:
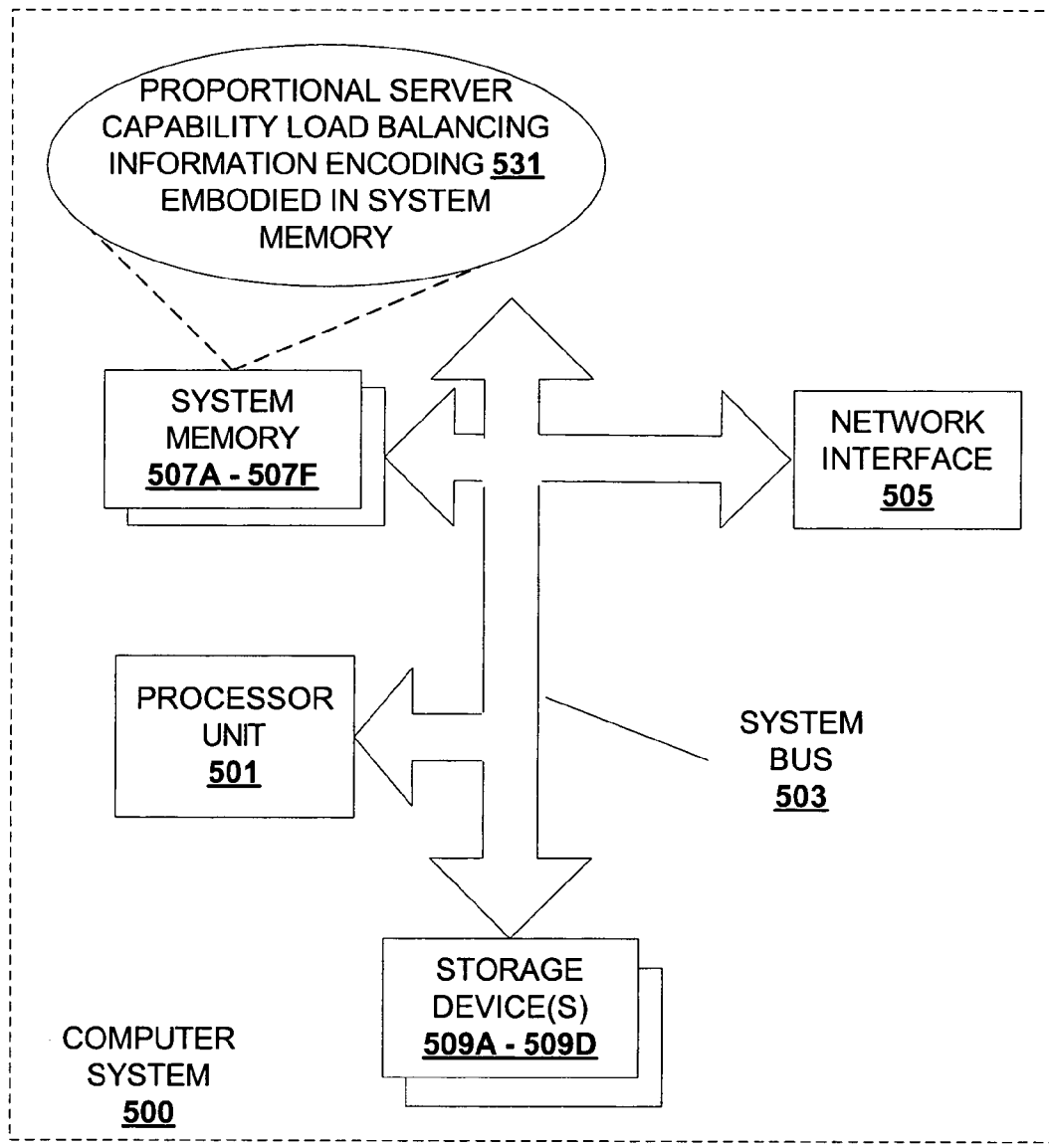
FIG. 5 depicts an exemplary computer system according to some realizations of the invention.

FIG. 5 depicts an exemplary computer system according to some realizations of the invention. A computer system 500 includes a processor unit 501 (possibly including multiple processors). The computer system 500 also includes a system memory 507A-507F (e.g., one or more of cache, SRAM DRAM, RDRAM, EDO RAM, DDR RAM, EEPROM, etc.), a system bus 503 (e.g., LDT, PCI, ISA, etc.), a network interface 505 (e.g., an ATM interface, an Ethernet interface, a Frame Relay interface, etc.), and a storage device(s) 509A-509D (e.g., optical storage, magnetic storage, etc.). The system memory 507A-507F embodies an adaptive load balancer 531. Although FIG. 5 illustrates the system memory 507A-507F, all or some of the system memory 507A-507F may be incorporated into the processor unit 501.

Realizations of the invention may include fewer or additional components not illustrated in FIG. 5 (e.g., video cards, audio cards, additional network interfaces, peripheral devices, etc.). The processor 501, the storage device(s) 509A-509D, the network interface 505, and the system memory 507A-507F are coupled to the system bus 503.

While the invention has been described with reference to various realizations, it will be understood that these realizations are illustrative and that the scope of the invention is not limited to them. For example, measurement of server work capability is not limited to proportion of sample requests serviced. A variety of benchmarks and/or measurements can be used as a basis for weighing servers in a proportional server capability load balancing information encoding. Many variations, modifications, additions, and improvements are possible.

More generally, realizations in accordance with the present invention have been described in the context of particular realizations. For example, the described realizations of the invention refer to directory requests and directory servers, but realizations of the invention include information repositories that provide information to users. These realizations are meant to be illustrative and not limiting. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the exemplary configurations may be implemented as a combined structure or component. These and other variations, modifications, additions, and improvements may fall within the scope of the invention as defined in the claims that follow.

What is claimed is:

1. A computer readable storage medium storing one or more routines executable by a computer processor running on at least one collection computer, the routines comprising:

one or more load balancing routines that collect proportional server capability information for a plurality of servers, wherein the proportional server capability information is based at least in part on processing of sample requests transmitted to the plurality of servers during intervals;

wherein the one or more load balancing routines encode the collected proportional server capability information in a weighted distribution that represents the plurality of servers in a weighted manner based at least in part on the proportional server capability information, the weighted manner reflecting a percentage of total server capability realized by each server, wherein the encoded load balancing is stored in a persistent or non-persistent memory of the collection computer, wherein the encoding is one of either a linked list, a binary search tree, a hash table or an array, and wherein a proportion of entries, for each server, in the linked list, binary search tree, hash table or array correspond to the proportional server capability of each server; and wherein the one or more routines further randomly select servers to process client requests from the weighted distribution.

2. The computer readable storage medium of claim 1 wherein the load balancing of client requests comprises selection of entries from the proportional server capability encoding, wherein each entry indicates at least one of the plurality of servers.

3. The computer readable storage medium of claim 1 wherein the collecting of server capability information comprises transmitting the sample requests to the plurality of servers during the intervals and recording information that corresponds to the servers servicing of the sample requests.

4. The computer readable storage medium of claim 1 wherein the sample requests include a mixture of configurable directory requests.

5. The computer readable storage medium of claim 1 wherein the server capability information includes one or more of a percentage of serviced sample requests, time to serve each sample request, time to serve total sample requests, percentage of sample request types serviced, and time to serve sample request types.

6. The computer readable storage medium of claim 1 wherein the one or more load balancing routines update a proportional server capability based load balancing encoding in accordance with the collected server capability information.

7. The computer readable storage medium of claim 6 wherein the one or more load balancing routines update the proportional server capability based load balancing encoding in response to a change in network configuration.

8. The computer readable storage medium of claim 7 wherein the change of network configurations includes change of server availability.

9. The computer readable storage medium of claim 1 embodied in one or more of cache, registers, memory, and fast look-up tables.

10. A method comprising:
during intervals, collecting data that reflects capabilities of a plurality of backend servers at a collection computer, wherein the backend server capability data is based at least in part on servicing of sample requests by the plurality of backend servers;
encoding the collected backend server capability data to reflect backend server capability of each of the plurality of backend servers each server's percentage of the total processing capability being reflected, wherein the encoding is one of either a linked list, a binary search tree, a hash table or an array and wherein a proportion of entries for each server, in the linked list, binary search tree, hash table or array correspond to the proportional server capability of each server; and
storing the encoded collected backend server capability data in at least one of a persistent or non-persistent memory included with the collection computer.

11. The method of claim 10 wherein the collected backend server capability data is encoded to indicate each of the plurality of backend servers in accordance with their proportional capability based at least in part on the collected backend server capability data.

12. The method of claim 10 further comprising updating the encoding in accordance with the collected data.

13. The method of claim 10 further comprising load balancing client requests in accordance with the encoding.

14. The method of claim 13 wherein the load balancing comprises randomly selecting entries from the encoding, wherein the encoding includes entries that indicate the plurality of backend servers.

15. The method of claim 10 wherein the collected backend server capability data includes one or more of a percentage of sample requests serviced by each of the backend servers, time for each of the backend servers to serve each sample request, time for each of the backend servers to serve total sample requests, proportion of sample request types serviced by each of the backend servers, and time for each of the backend servers to serve sample request types.

16. The method of claim 10 wherein collecting backend server capability data comprises:
transmitting the sample requests to the backend servers; and
recording data that corresponds to servicing of the sample requests by the backend servers.

17. The method of claim 10 wherein the sample requests include sample directory requests.

18. The method of claim 17 wherein the sample directory requests are in accordance with one or more protocol including lightweight data access protocol and universal description discovery and integration.

19. The method of claim 10 executed by a computer processor reading a computer program product encoded on one or more machine-readable media.

20. A method comprising:
maintaining a server capability information encoding stored in at least one of a persistent or non-persistent memory in a computer, wherein the maintaining includes at least periodically updating the server capability information stored in at least one of the persistent or non-persistent memory, and, wherein the encoding is one of either a linked list, a binary search tree, a hash table or an array, and wherein a proportion of entries, for each server, in the linked list, binary search tree, hash table or array correspond to the proportional server capability of each server;
load balancing client requests across a plurality of servers in accordance with the server capability information encoding that reflects capabilities of each the plurality of servers in relation to the capabilities of all the servers collectively, such that each server's percentage of the collective capability is reflected in the encoding, wherein the reflected server capability information is based at least in part on servicing of sample requests by the plurality of servers.

21. The method of claim 20 wherein encoding reflects frequency of sample requests serviced by the servers.

22. The method of claim 21 wherein the frequency of sample requests serviced includes one or more of number of sample requests serviced during a time interval, number of sample requests serviced during a time interval based on type of sample requests, time to service a number of sample requests, and time to service a number of sample requests based on type of sample requests.

23. The method of claim 20 further comprising collecting the server capability information at intervals between servicing of client requests.

24. The method of claim 20 wherein updating the server capability information encoding comprises:
transmitting the sample requests to the plurality of servers at intervals; and recording the server capability information that indicates frequency of the sample requests serviced by the servers in the persistent or non-persistent memory.

25. The method of claim 24 wherein the sample requests include a mixture of configurable sample requests.

26. The method of claim 20 wherein the encoding includes a data structure that proportionally represents the plurality of servers in accordance with the server capability information.

27. The method of claim 26 wherein the load balancing comprises selecting entries from the data structure at random.

28. The method of claim 27 wherein the load balancing comprises predetermined selection of entries from the data structure.

29. The method of claim 20 executed by a computer processor reading a computer program product encoded in one or more machine-readable medium.

30. A method comprising:
during a data collection interval,
transmitting sample requests to servers,
recording data that corresponds to servicing of the transmitted sample requests by each of the servers in at least one of a persistent or non-persistent memory in a recording computer; and encoding the recorded data, wherein the encoding of the data represents each of the servers in accordance with their percentage of total server capability based at least in part on the recorded data, and wherein the encoding is one of either a linked list, a binary search tree, a hash table or an array, and wherein a proportion of entries, for each server, in the linked list, binary search tree, hash table or array correspond to the proportional server capability of each server.

31. The method of claim 30 wherein the encoding includes a load balancing table, and wherein a number of entries for each server in the load balancing table exist in accordance with the server capability of each server.

32. The method of claim 31 further comprising randomly selecting entries from the load balancing table to load balance client requests across the servers.

33. The method of claim 31 further comprising predetermined selection of entries from the load balancing table to load balance client requests across the servers.

34. The method of claim 30 further comprising load balancing client requests in accordance with the encoding.

35. The method of claim 30 further comprising randomly selecting entries from the load balancing structure to load balance client requests.

36. The method of claim 30 wherein the sample requests include search requests, compare requests, and update requests.

37. The method of claim 30 wherein the recorded data indicates one or more of number of sample requests serviced during the data collection interval by each of the directory servers, number of sample requests serviced during the data collection interval by each of the directory servers based on sample request type, time for each directory server to service a number of sample requests during the data collection interval, and time for each of the directory servers to service a number of sample requests based on type of sample requests during the data collection interval.

38. The method of claim 30 further comprising servicing client requests with a second plurality of servers during the data collection interval.

39. The method of claim 30 further comprising buffering client requests during the data collection interval.

40. The method of claim 30 executed by a computer processor reading a computer program product encoded in one or more machine-readable medium.

41. A machine-readable storage medium storing one or more instructions executable by a computer processor, the instructions comprising:

a first sequence of instructions to transmit sample requests to a plurality of servers at intervals and receive responses corresponding thereto;
a second sequence of instructions to determine capability information for each of the plurality of servers that reflects capabilities of each of the plurality of servers as a percentage of total server capability, based at least in part on the sample requests and corresponding responses; and
a third sequence of instructions to encode the determined capability of each of the plurality of servers into a representative encoding, wherein the representative encoding represents each of the plurality of servers in accordance with each server's determined proportional capability, wherein the encoding is one of either a linked list, a binary search tree, a hash table or an array, and wherein a proportion of entries, for each server, in the linked list, binary search tree, hash table or array correspond to the proportional server capability of each server.

42. The machine readable storage medium of claim 41, wherein the third sequence of instructions further includes instructions to maintain the server capability encoding for load balancing.

43. The machine readable storage medium of claim 41, further comprising a fourth sequence of instructions to load balance client requests in accordance with the server capability encoding.

44. The machine readable storage medium of claim 43, further comprising a fifth sequence of instructions to buffer client requests during the intervals.

45. The machine readable storage medium of claim 43, further comprising the third sequence of instructions to forward client requests to standby servers during the intervals.

46. The machine readable storage medium of claim 41, wherein the second sequence of instructions measures one or more of time for each of a plurality of servers to respond to each request, time for each of a plurality of servers to respond to each request based on request type, total number of responses provided by each of a plurality of servers during the periodic intervals, and number of responses provided by each of a plurality of servers based on request type.

47. A machine-readable storage medium, storing a computer program product comprising:
a first sequence of instructions to update a server capability load balancing information encoding including indications for each server that reflect measured sample request based capabilities of a plurality of servers, the reflection represented by relative occurrence of the indications for each server and indicative of a percentage of total server capability reflected by each server, wherein the encoding is one of either a linked list, a binary search tree, a hash table or an array, and wherein a proportion of entries, for each server, in the linked list, binary search tree, hash table or array correspond to the proportional server capability of each server,
wherein the proportional measured sample request based capabilities are measured during intervals; and
a second sequence of instructions to select server indications from the proportional server capability load balancing information encoding to load balance client requests.

48. The machine readable storage medium of claim 47, wherein the computer program product further comprises a third sequence of instructions to buffer client requests while the first sequence of instructions updates the server capability load balancing information encoding.

49. The machine readable storage medium of claim 47, wherein the computer program product further comprises a third sequence of instructions to forward client requests to standby servers while the first sequence of instructions updates the server capability load balancing information encoding.

50. The machine readable storage medium of claim 47, wherein the computer program product further comprises a third sequence of instructions to measure capabilities of the plurality of directory servers based at least in part on sample requests.

51. The machine readable storage medium of claim 50 wherein the third sequence of instructions to measure capabilities comprises the third sequence of instructions to transmit the sample requests to the plurality of directory servers and to receive responses corresponding thereto during the intervals.

52. The machine readable storage medium of claim 47 wherein the measured sample request based capabilities include one or more of number of sample directory requests serviced during a time interval, number of sample directory requests serviced during a time interval based on type of sample requests, time to service a number of sample directory requests during a time interval, and time to service a number of sample directory requests based on type of sample requests during a time interval.

53. The machine readable storage medium of claim 47 wherein the requests include directory requests.

54. A network comprising:
   a plurality of servers processing requests; and
   a computer readable storage media containing one or more routines executable by a computer processor, the routines including one or more load balancing routines forwarding client requests in accordance with a server capability information encoding that indicates each of the plurality of servers in accordance with their processing capability as a percentage of total capability, wherein the server capability information encoding is based at least in part on servicing of sample requests during intervals between forwarding of client requests, wherein the encoding is one of either a linked list, a binary search tree, a hash table or an array, and wherein a proportion of entries, for each server, in the linked list, binary search tree, hash table or array correspond to the proportional server capability of each server.

55. The network of claim 54 wherein the one or more load balancing routines measuring the capabilities of the plurality of servers during the intervals.

56. The network of claim 55 wherein measuring includes transmitting the sample requests and receiving responses corresponding to the sample requests.

57. The network of claim 54 further comprising one or more standby servers to handle client requests while the load balancer measures capabilities of the plurality of servers.

58. A computer readable storage medium storing one or more routines executable by a computer processor, the execution of the one or more routines causing the computer processor to perform at least:
   collecting server capability information for a plurality of servers, wherein the server capability information is based at least in part on processing of sample requests transmitted to the plurality of servers;
   encoding the server capability information in a weighted distribution, such that portions of the weighted distribution corresponding to each server occupy a portion of the weighted distribution substantially equivalent to the processing capability of each of the servers as a percentage of the total capability, wherein the weighted distribution is further encoded as one of either a linked list, a binary search tree, a hash table or an array, and wherein a proportion of entries, for each server, in the linked list, binary search tree, hash table or array correspond to the server capability of each server as a percentage of total server capability; and
   selecting, from the weighted distribution, a server to process a client request.

59. The computer readable storage medium of claim 58, wherein the server capability information is, representative of the server capability of each server in comparison to the server capability of all the servers.

60. The computer readable storage medium of claim 58, wherein the server capability information is based at least in part on processing of a single set of sample requests transmitted to the plurality of servers.

61. The computer readable storage medium of claim 58, wherein the sample requests are transmitted at regular intervals.

62. The computer readable storage medium of claim 58, wherein the selecting is done at random.

* * * * *